US 009606929 B2

(12) United States Patent
Brosnan et al.

(10) Patent No.: US 9,606,929 B2
(45) Date of Patent: Mar. 28, 2017

(54) SIMULATED NVRAM

(75) Inventors: Susan W. Brosnan, Raleigh, NC (US);
Patricia S. Hogan, Raleigh, NC (US);
John David Landers, Jr., Raleigh, NC (US);
David J. Steiner, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 91 days.

(21) Appl. No.: 13/291,239

(22) Filed: Nov. 8, 2011

(65) Prior Publication Data

US 2013/0117498 A1 May 9, 2013

(51) Int. Cl.
G06F 12/00 (2006.01)
G06F 13/00 (2006.01)
G06F 13/28 (2006.01)
G06F 12/0871 (2016.01)
G06F 12/0868 (2016.01)
G06F 12/0804 (2016.01)

(52) U.S. Cl.
CPC ...... G06F 12/0871 (2013.01); G06F 12/0804 (2013.01); G06F 12/0868 (2013.01)

(58) Field of Classification Search
CPC ............. G06F 12/0804; G06F 12/0806; G06F 12/0871; G06F 12/0873; G06F 12/12
USPC .................................. 711/144, 103
See application file for complete search history.

(56) References Cited

U.S. PATENT DOCUMENTS 5,197,144 A * 3/1993 Edenfield ............ G06F 12/0804
711/122
5,408,644 A * 4/1995 Schneider .............. G11C 29/88
711/E12.019
5,581,726 A * 12/1996 Tanaka ................ G06F 12/0804
711/103
5,596,736 A * 1/1997 Kerns .................... G06F 3/0601
711/100
5,627,990 A * 5/1997 Cord .................... G06F 12/0866
711/113
5,915,262 A * 6/1999 Bridgers ............. G06F 12/0802
711/118
6,513,097 B1 * 1/2003 Beardsley .......... G06F 11/0724
711/113

(Continued)

FOREIGN PATENT DOCUMENTS

JP    8161135 A    6/1996
TW    I291618 B    12/2007

OTHER PUBLICATIONS

Computer Architecture: A Quantitative Approach Third Edition, Hennessy et al, May 2002, pp. 554-555 (2 pages).*

(Continued)

*Primary Examiner* — Daniel C Chappell
(74) *Attorney, Agent, or Firm* — Lieberman & Brandsdorfer, LLC

(57) ABSTRACT

Embodiments of the invention relate to leveraging disk controller cache memory to simulate non-volatile random access memory. At least one logical block address in cache memory of the disk controller is designated and set aside as permanently dirty. Read operations may be supported with data in the cache memory; including data retained in any block address designated as permanently dirty. Write operations may also be supported by storing the write data in the logical block address designated as permanently dirty.

19 Claims, 4 Drawing Sheets

(56) References Cited

U.S. PATENT DOCUMENTS

| | | | | |
|---|---|---|---|---|
| 7,062,675 | B1* | 6/2006 | Kemeny | G06F 11/1441 |
| | | | | 711/135 |
| 7,246,208 | B2* | 7/2007 | Hoshino | G06F 12/084 |
| | | | | 707/999.102 |
| 8,161,236 | B1* | 4/2012 | Noveck | G06F 12/0875 |
| | | | | 711/113 |
| 9,323,659 | B2* | 4/2016 | Shats | G06F 12/0246 |
| 2002/0161971 | A1 | 10/2002 | Dimitri et al. | |
| 2004/0059958 | A1 | 3/2004 | Umberger et al. | |
| 2005/0243609 | A1* | 11/2005 | Yang | G06F 3/0617 |
| | | | | 365/189.05 |
| 2006/0072369 | A1* | 4/2006 | Madter | G06F 12/0804 |
| | | | | 365/232 |
| 2007/0079098 | A1 | 4/2007 | Kitamura | |
| 2009/0300280 | A1 | 12/2009 | Jutzi et al. | |
| 2011/0191535 | A1* | 8/2011 | Yuasa | G06F 12/08 |
| | | | | 711/113 |
| 2012/0297140 | A1* | 11/2012 | Wu | G06F 12/0897 |
| | | | | 711/133 |
| 2014/0189203 | A1* | 7/2014 | Suzuki | G06F 12/0246 |
| | | | | 711/103 |
| 2015/0006815 | A1* | 1/2015 | Madhusudana | G06F 12/0866 |
| | | | | 711/114 |

OTHER PUBLICATIONS

Definition of "flag", Free Online Dictionary of Computing, retrieved Aug. 27, 2013 from http://foldoc.org/flag (1 page).*

Definition of permanent, Webster's New World College Dictionary, retrieved from http://www.yourdictionary.com/permanent on Nov. 8, 2013 (1 page).*

NVMFS: A hybrid file system for improving random write in nand-flash SSD; Qiu et al; 2013 IEEE 29th Symposium Storage Systems and Technologies; May 6-Oct. 2013 (5 pages).*

Multi-Buffer Manager: Energy-Efficient Buffer Manager for Databases on Flash Memory; Cesana et al; ACM Transactions on Embedded Computing Systems, vol. 9, issue 3, article No. 28; Feb. 2010 (36 pages).*

Saito et al., FAB: Building Distributed Enterprise Disk Arrays from Commodity Components, ASPLOS, Oct. 2004, pp. 48-58, Boston, MA, US.

* cited by examiner

SIMULATED NVRAM

BACKGROUND

The invention relates to a simulation of the functionality of non-volatile random access memory (NVRAM). More specifically, the invention relates to leveraging cache memory of a disk controller to support the functionality associated with NVRAM without requiring additional hardware.

A non-volatile random access memory card (NVRAM card) is used to store critical data that must be maintained regardless of a system's operating conditions. The NVRAM card is a hardware element that is employed by a controller to maintain data that an associated operating system needs to retain. There are many functions that are placed on the NVRAM card, including employing the NVRAM card to maintain a copy of local disk writes to prevent loss of data pertaining to power failure, and to maintain a location record of data written to disk. In one embodiment, the NVRAM card is employed as cache for data access. Accordingly, the NVRAM card is an additional hardware element employed by the controller and an associated operating system to support data processing.

BRIEF SUMMARY

This invention comprises a method, system, and article for supporting the functionality of NVRAM with existing hardware, and specifically for modifying a disk cache controller to support reliability associated with NVRAM.

In one aspect of the invention, a method is provided with a disk controller in communication with storage media. The disk controller is provided with cache memory and an operating system in communication with the cache memory. A logical block address of cache memory of the disk controller is set aside. The operating system, which is in communication with the disk controller, maintains this set aside logical block address as permanently dirty. The functionality of the operating system supports both read and write operations. The read operations read date from volatile memory and the write operations store write data in the volatile memory. With respect to both read and write operations, the permanent dirty bit in the set aside logical block address is maintained.

In another aspect of the invention, a system is provided with a disk controller in communication with storage media. The disk controller includes both cache memory and an operating system in communication with the cache memory. A manager is provided in communication with the disk controller to set aside a logical block address of the cache memory. The operating system, which is in communication with both the disk controller and the manager, maintains the set aside logical block address as permanently dirty. The operating system supports both a read operation and a write operation. More specifically, a director is provided in communication with the operating system to read data from volatile memory to support the read operation and to write data in volatile memory to support the write operation. Regardless of the mode of the operation being a read or a write, the director communicates with the manager to maintain the permanent dirty bit in the set aside logical block address.

In yet another aspect, a computer program product is provided with a computer readable storage medium with computer readable program code. More specifically, computer readable program code is configured to set aside a logical block address of a disk controller cache memory, and to maintain the set aside logical block address as permanently dirty. Computer readable program code is also provided to support read and write operations. The read operations read data from volatile memory to support the read operation(s), and the write operations store write data in the volatile memory to support the write operation(s). The program code to support the read and write operations maintains the permanent dirty bit in the set aside logical block address.

Other features and advantages of this invention will become apparent from the following detailed description of the presently preferred embodiments of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention and not all embodiments of the invention unless otherwise explicitly indicated. Implications to the contrary are otherwise not to be made.

DETAILED DESCRIPTION

Figure 1:
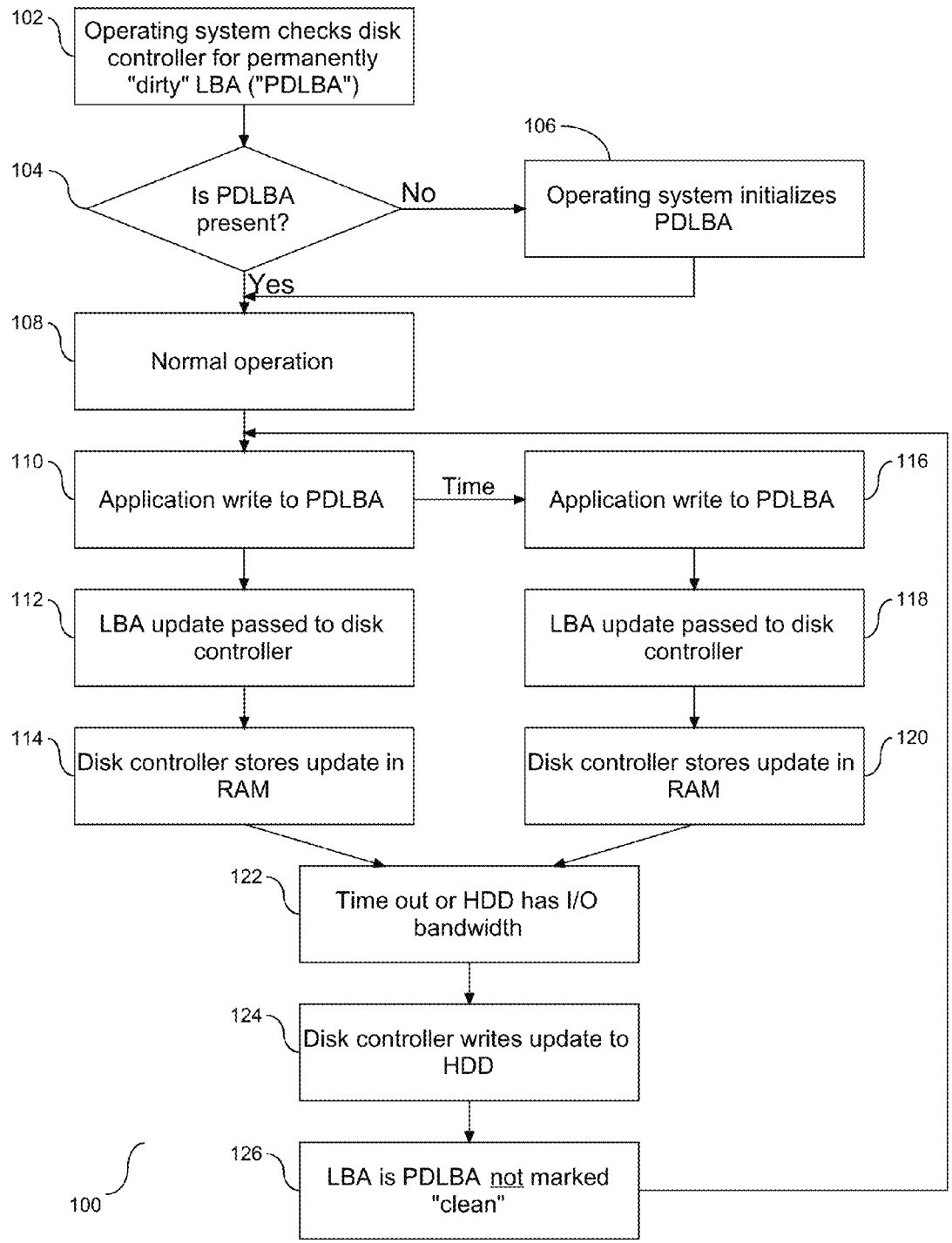
FIG. 1 is a flow chart illustrating a write operation to disk controller cache memory.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools in the form of a manager and a director. A functional unit may be implemented in programmable hardware devices such as field programmable gate arrays, programmable array logic, programmable logic devices, and the like. The functional unit may also be implemented in software for processing by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the manager and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations (e.g., over different storage devices), and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of one or more managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Cache is employed in a computer system to store data locally in order to speed up subsequent retrieval of the stored data. Accessing data in cache memory is more efficient than accessing memory in persistent storage. The process of caching data uses buffers to separate operations that differ in speed. One level of cache data leverages a battery backed up disk controller cache, hereinafter referred to as cache, which is functionally equivalent to NVRAM. The battery backed up cache is an additional feature on the disk controller and does not require use of an extra card or associated slot. Accordingly, the battery backed up disk controller cache may replace the functionality and use of an NVRAM card.

Disk cache functions on the granularity of data blocks and not on files. Blocks of data are read into disk cache. Data blocks stored in the random access memory of a storage controller cache memory that do not match data stored in persistent storage are referred to as 'dirty' and a dirty flag is employed to designate the associated blocks as such. Dirty blocks are written from the disk cache to persistent storage, e.g. flushed. When data in the random access memory of the storage controller cache memory is written to persistent storage, the dirty flag is cleared, thereby making the random access memory available to store other data. Any blocks in the disk cache random access memory that are not marked dirty are subject to over-writing.

A command is added to the disk cache controller to designate a set of blocks and to mark such designated blocks as permanently dirty. Data in such designated blocks are always stored in the disk controller cache and are not subject to periodic flushing to persistent storage. FIG. 1 is a flow chart (100) illustrating a process for supporting a disk cache write operation with a permanent dirty logical block address. During initialization, the operating system checks the disk cache controller for a logical block address marked as permanently dirty (102). It is then determined if there is a logical block address marked by a flag as permanently dirty (104). A negative response to the determination at step (104) is followed by the operating system initializing a specific logical block address in the disk cache controller as permanently dirty (106). Following either step (106) or a positive response to the determination at step (104), write operations continue to operate under normal operating conditions (108). In one embodiment, two or more logical block addresses in the cache memory may be maintained by a flag as permanently dirty. Accordingly, at least one logical block address of the disk controller cache memory is set aside and maintained as permanently dirty.

When subject to a write operation, the application writes to the logical block address maintained as permanently dirty (110), and an update to the logical block address is passed to the disk controller (112), which stores the update in Random Access Memory (RAM) (114). Following step (114), an application can proceed with a subsequent write operation that parallels the write operation shown in steps (110)-(114). More specifically, the next write operation writes data to the logical block address marked with a flag as permanently dirty (116), and the update to the logical block address is passed to the disk controller (118), which stores the update in RAM (120). Cached data, including data written to the logical block address that is marked by a flag as permanently dirty, is periodically flushed to persistent storage. Following completion of at least one write operation (114) and/or (120), the act of flushing data takes place when there is a time out or the persistent storage has I/O bandwidth available to flush the logical block address to persistent storage (122). In one embodiment, the flushing of data takes place when space in RAM is needed to support another operation. However, since the logical block address is maintained as permanently dirty, the logical block address within the cache memory is prevented from being flushed out of the disk controller cache. In one embodiment, the copy of the data maintained in the cache following the act of flushing becomes the primary valid data set. Accordingly, data written to RAM is periodically written to persistent storage with one or more logical block addresses maintained as permanently dirty and preventing the cache memory from being flushed out of the cache.

Following step (122), the disk controller associated with the cached data writes an update to the persistent storage subject to the data being flushed (124). The maintenance of the logical block address marked as permanently dirty does not change (126) following the update to the persistent storage at step (124). Since the logical block address is maintained as permanently dirty, the cache controller will only go to RAM to support a read operation at the specified logical block address. The cache controller will not read data from persistent storage to read data out of the subject logical block address. Following step (126), the process returns to step (110) to support a subsequent write operation. Accordingly, after data from one or more write operations are flushed to persistent storage, the logical block address on the disk controller cache remains maintained as permanently dirty.

Figure 2:
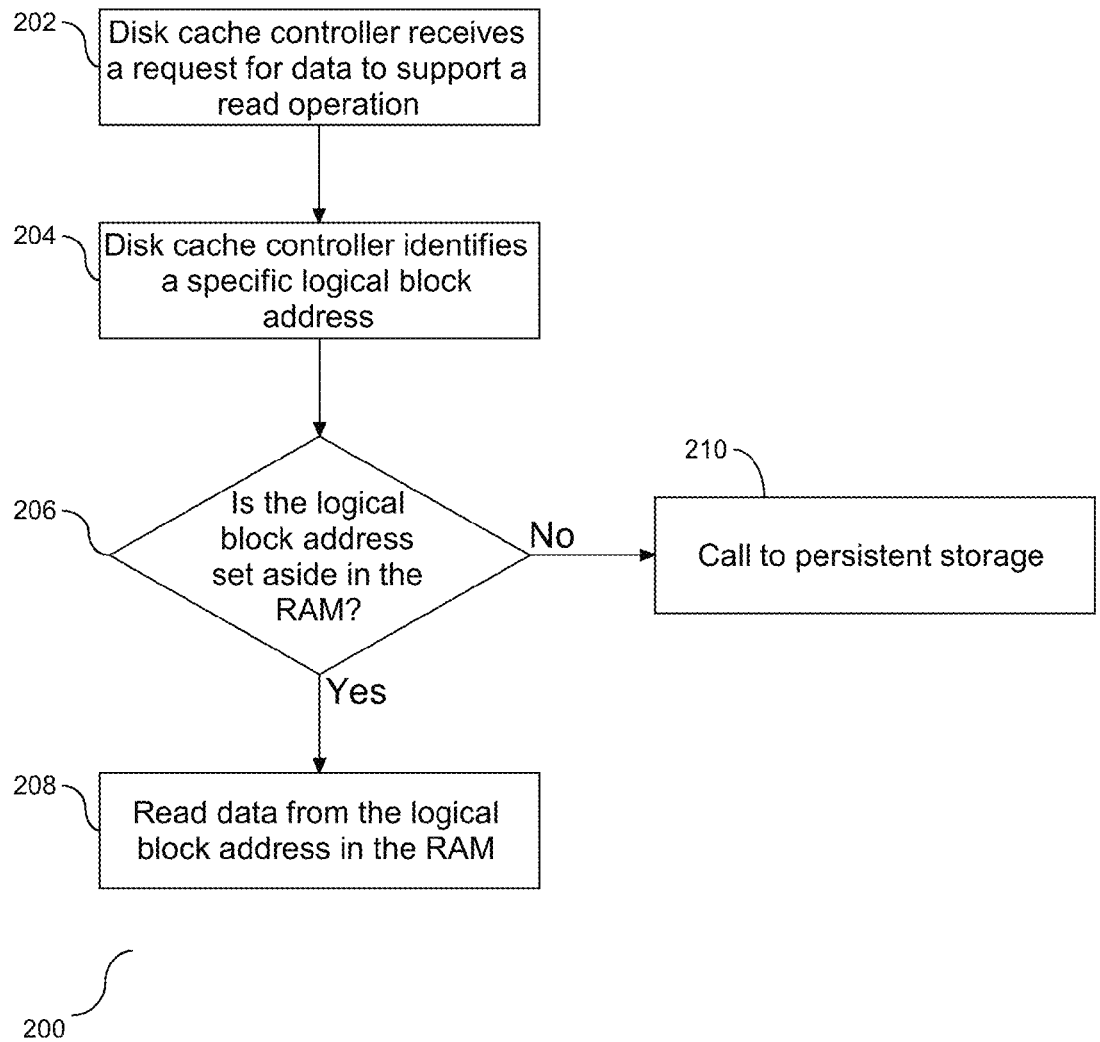
FIG. 2 is a flow chart illustrating a read operation from disk controller cache memory.

The operating system supports both read and write operations. Data to support the write operation is stored in cache memory, i.e. volatile memory. The aspect of marking a logical block address as permanently dirty is also supported by the operating system for a read operation, as shown in detail in FIG. 2. More specifically, FIG. 2 is a flow chart (200) illustrating a process for processing a read operation. As shown, the disk cache controller receives a request for data to support a read operation (202). The disk cache controller identifies a specific logical block address to support the read operation (204). It is then determined if the identified logical block address is set aside in the RAM (206). A positive response to the determination at step (206) is followed by reading the data from the logical block address in the RAM to support the read operation (208). It should be noted that if the subject logical block address is permanently marked as dirty, e.g. not set to clean following a write update to persistent storage, than the determination at step (206) will not fail. However, a negative response to the determination at step (206) is followed by a call to the persistent storage to support the read operation (210). Accordingly, by maintaining the logical block address as permanently dirty, the read operation is supported by cached data without the need to read data from persistent storage.

Figure 3:
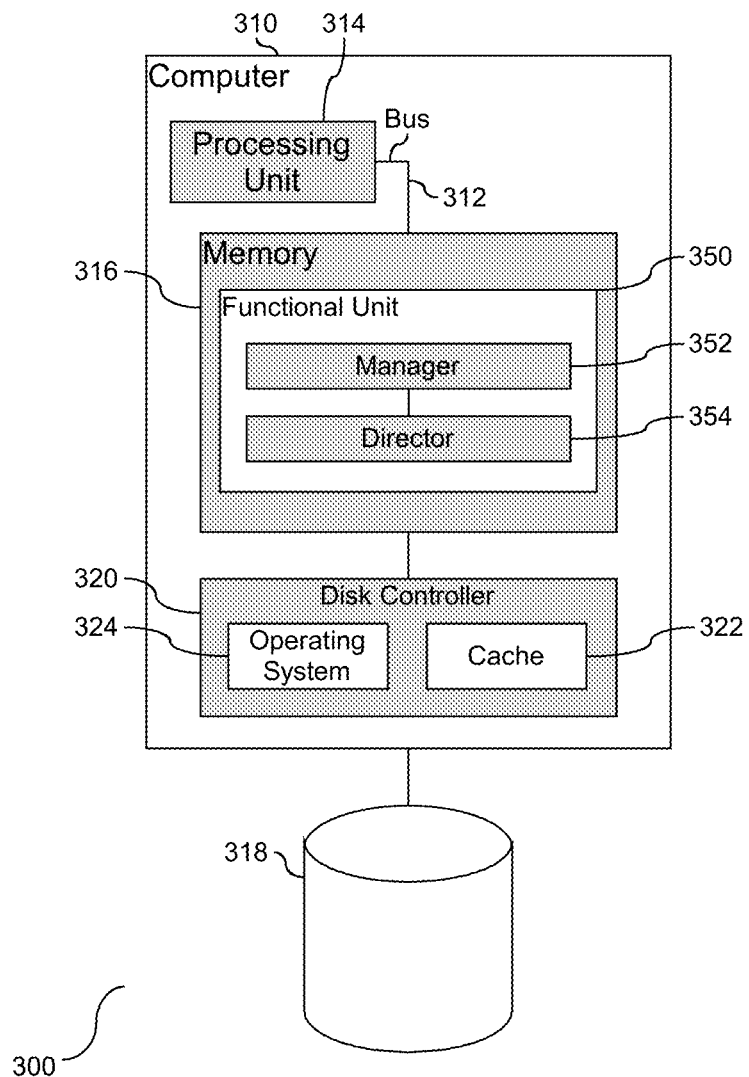
FIG. 3 is a block diagram illustrating tools embedded in a computer system to support read and write operations from and to disk controller cache memory.

As demonstrated in the flow charts of FIGS. 1 and 2, a method is employed for maintaining one or more logical block addresses in disk controller cache memory as permanently dirty. More specifically, the leverage of the disk controller cache memory in the manner shown in FIGS. 1 and 2 simulates the functionality of NVRAM without the hardware requirements associated with NVRAM. FIG. 3 is a block diagram (300) illustrating tools embedded in a computer system to support simulation of the functionality of NVRAM. As shown, a computer (310) is provided with a processing unit (314) in communication with memory (316) across a bus (312), and in communication with data storage (318). A disk controller (320) is provided in communication with the data storage (318) to translate commands into a form that can control the data storage (318). Disk controllers come in different forms, with each form functioning to control data transfer to and from data storage. As shown herein, the disk controller (320) includes cache memory (322) and an operating system (324) in communication with the cache memory.

A functional unit (350) is provided local to memory (316) and in communication with the disk controller (320). The functional unit (350) is provided with a manager (352) to set aside a logical block address of the disk controller cache memory (322), and a director (354). The manager (352) functions with the operating system to support the functionality of the set aside. More specifically, the operating system (324) maintains the set aside of the logical block address by the manager (352) in a permanently dirty state, with the set aside specific to the logical block address. In one embodiment, the manager (352) designates two or more logical block addresses in the cache memory (322) as permanently dirty. This set aside and designation of the logical block address by the manager (352) prevents the logical block address within the cache memory (322) from being flushed out of the disk controller cache (322). More specifically, one or more logical block addresses marked as permanently dirty are not subject to being flush to persistent storage (318) and freed from cache memory (322). Accordingly, a logical block address may be marked as dirty, clean, or permanently dirty.

The director (354) also communicates with the operating system (324). The director (354) functions to support read and write operations in view of the logical block address set aside. The director (354) reads data from the cache memory (322) to support a read operation, and stores write data in the cache memory (322) to support a write operation. At the same time, the director (354) communicates with the manager (352) to maintain the permanent dirty bit in the set aside logical block address of the disk controller cache memory (322). Accordingly, the manager (352) and director (354) function together with the operating system to set aside and maintain a logical block address in cache memory in a permanently dirty state.

As noted above, the operating system (324) supports both read and write operations with the set aside of the logical block address(es) in the disk controller cache memory (322). The read operation may be supported with data in one or more of the set aside logical block address(es). The write operation functions to write data to memory. With respect to the set aside logical block address(es), the director (354) periodically writes data stored in the logical block address in cache memory (322) to persistent storage (318). At the same time, the manager (352) maintains a copy of the data in the cache memory (322) as the primary valid data set. This maintenance enables a subsequent read operation to be supported from cache memory (322). Accordingly, data retained in the logical block address(es) that have been set aside, may be employed to support a read operation from cache, with a copy of the data transmitted to data storage.

As shown herein, the functional unit (350) is provided local to the system (10). However, in one embodiment, the functional unit (350) may be in communication with the system (310) across a network (not shown). Similarly, the manager (352) and director (354) are provided local to the system (310) to support both read and write operations together with the logical block address set aside. More specifically, the manager (352) and director (354) function as elements to support the creation of the logical block address set aside in cache memory (322), as well as the designation of the logical block address set aside as permanently dirty. The manager (352) and director (354) are shown residing in memory (316) local to the system (310). However, the manager (352) and director (354) may reside as hardware tools external to memory (316), or they may be implemented as a combination of hardware and software. Similarly, in one embodiment, the manager and director (352) and (354), respectively, may be combined into a single functional item that incorporates the functionality of the separate items. As shown herein, each of the manager (352) and director (354) are shown local to the system (310). However, in one embodiment they may be collectively or individually distributed across the network (not shown) and function as a unit to manage creation and maintenance of the logical block address set aside. Accordingly, the manager and director may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
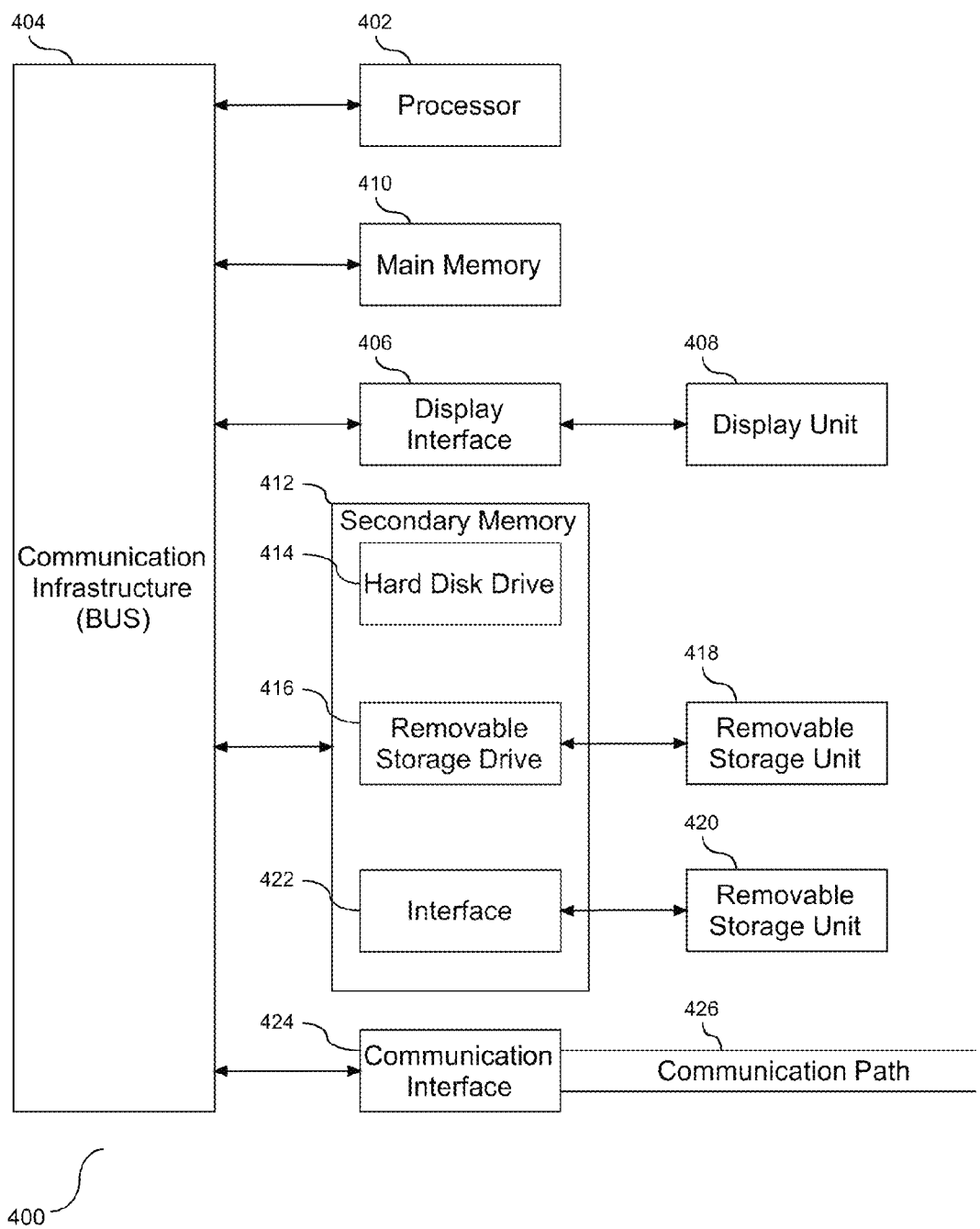
FIG. 4 is a block diagram showing a system for implementing an embodiment of the present invention.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (410) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by a removable storage drive (416). As will be appreciated, the removable storage unit (418) includes a computer-readable medium having stored therein computer software and/or data.

In alternative embodiments, the secondary memory (412) may include other similar means for allowing computer programs or other instructions to be loaded on the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer-readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, an application program interface (API) may be employed to flag a block in cache memory as dirty, clean, or permanently dirty. Accordingly, the scope of protection of this invention is limited only by the following claims and their equivalents.

We claim:

1. A method comprising:
   a disk controller in communication with storage media, the disk controller including volatile cache memory;
   an operating system in communication with the cache memory;
   setting aside a logical block address of the disk controller cache memory;
   the operating system in communication with the disk controller maintaining the set aside logical block address as permanently dirty, including maintaining a bit designating the set aside logical block address as permanently dirty, the designation being persistent across one or more system state changes; and
   the operating system supporting read and write operations, including reading data from the disk controller cache memory to support the read operation and storing write data in the disk controller cache memory to support the write operation, wherein data stored at the set-aside logical block address remains stored at the set-aside logical block address after at least one system state change.

2. The method of claim 1, wherein maintaining the set aside logical block address as permanently dirty includes preventing data stored at the logical block address within the cache memory from being flushed out of the disk controller cache.

3. The method of claim 1, further comprising designating at least two logical block addresses in the cache memory for marking as permanently dirty.

4. The method of claim 3, further comprising supporting a read operation to at least one of the designated two logical blocks with data in the designated logical block addresses.

5. The method of claim 1, wherein maintaining the set aside logical block address of the disk controller cache memory as permanently dirty is specific to one or more logical block addresses in the cache.

6. The method of claim 1, wherein maintaining the set aside logical block address as permanently dirty includes periodically writing data stored at the logical block address within the cache memory to persistent storage, and maintaining a copy of the data at the logical block address as a primary valid data set.

7. A system comprising:
   a disk controller in communication with storage media, the disk controller including volatile cache memory;
   an operating system in communication with the cache memory;
   a functional unit in communication with the disk controller, the functional unit comprising:
     a manager to set aside a logical block address of the disk controller cache memory;
     and a director in communication with the manager, the director to support a read operation and a write operation;
   the operating system in communication with the disk controller and the manager, the operating system to maintain the set aside logical block address by the manager as permanently dirty including maintaining a bit designating the set aside logical block address as permanently dirty. the designation being persistent across one or more system state changes; and the operating system to support read and write operations, including the director to read data from the disk controller cache memory to support the read operation and to store write data in the disk controller cache memory to support the write operation, wherein data stored at the set-aside logical block address remains stored at the set-aside logical block address after at least one system state change.

8. The system of claim 7, wherein maintaining the set aside logical block address as permanently dirty by the manager, includes the manager to prevent data stored at the logical block address within the cache memory from being flushed out of the disk controller cache.

9. The system of claim 7, further comprising the manager to designate at least two logical block addresses in the cache memory to be marked as permanently dirty.

10. The system of claim 9, further comprising the operating system to support a read operation to at least one of the designated two logical blocks with data in the designated logical block addresses.

11. The system of claim 7, wherein the maintenance of the set aside of logical block address of the disk controller cache memory as permanently dirty by the operating system is specific to one or more logical block addresses in the cache.

12. The system of claim 7, wherein maintenance of the set aside logical block address of the disk controller cache memory as permanently dirty by the operating system includes the director to periodically write data stored in the logical block address within the cache memory to persistent storage, and the manager to maintain a copy of the data at the logical block address as a primary valid data set.

13. A computer program product comprising a non-transitory computer readable storage medium having computer readable program code embodied therewith, the computer readable program code comprising:

computer readable program code configured to set aside a logical block address of volatile cache memory of a disk controller;

computer readable program code configured to maintain the set aside logical block address as permanently dirty, including maintaining a bit designating the set aside logical block address as permanently dirty, the designation being persistent across one or more system state changes; and computer readable program code to support read and write operations, including reading data from the cache memory of a disk controller to support the read operation and storing write data in the cache memory of a disk controller to support the write operation, wherein data stored at the set-aside logical block address remains stored at the set-aside logical block address after at least one system state change.

14. The computer program product of claim 13, wherein the program code to maintain the set aside logical block address as permanently dirty includes program code to prevent data stored at the logical block address within the cache memory from being flushed out of the disk controller cache.

15. The computer program product of claim 13, further comprising computer readable program code to designate at least two logical block addresses in the cache memory for marking as permanently dirty.

16. The computer program product of claim 15, further comprising computer readable program code to support a read operation to at least one of the designated two logical blocks with data in the designated logical block addresses.

17. The computer program product of claim 13, wherein the program code to maintain the set aside logical block address of the disk controller cache memory as permanently dirty is specific to one or more logical block addresses in the cache.

18. The computer program product of claim 13, wherein the program code to maintain the set aside logical block address as permanently dirty includes program code to periodically write data stored at the logical block address within the cache memory to persistent storage, and to maintain a copy of the data at the logical block address as a primary valid data set.

19. The method of claim 1, further comprising:

the operating system, upon initialization, identifying a previously set aside logical block address; and the operating system initializing the previously set aside logical block address, including maintaining the previously set aside logical block address as permanently dirty.

* * * * *